March 31, 1964 D. R. P. JACKSON 3,127,056
DEVICE FOR FEEDING ARTICLES FROM THE BOTTOM OF A STACK
Filed June 28, 1961
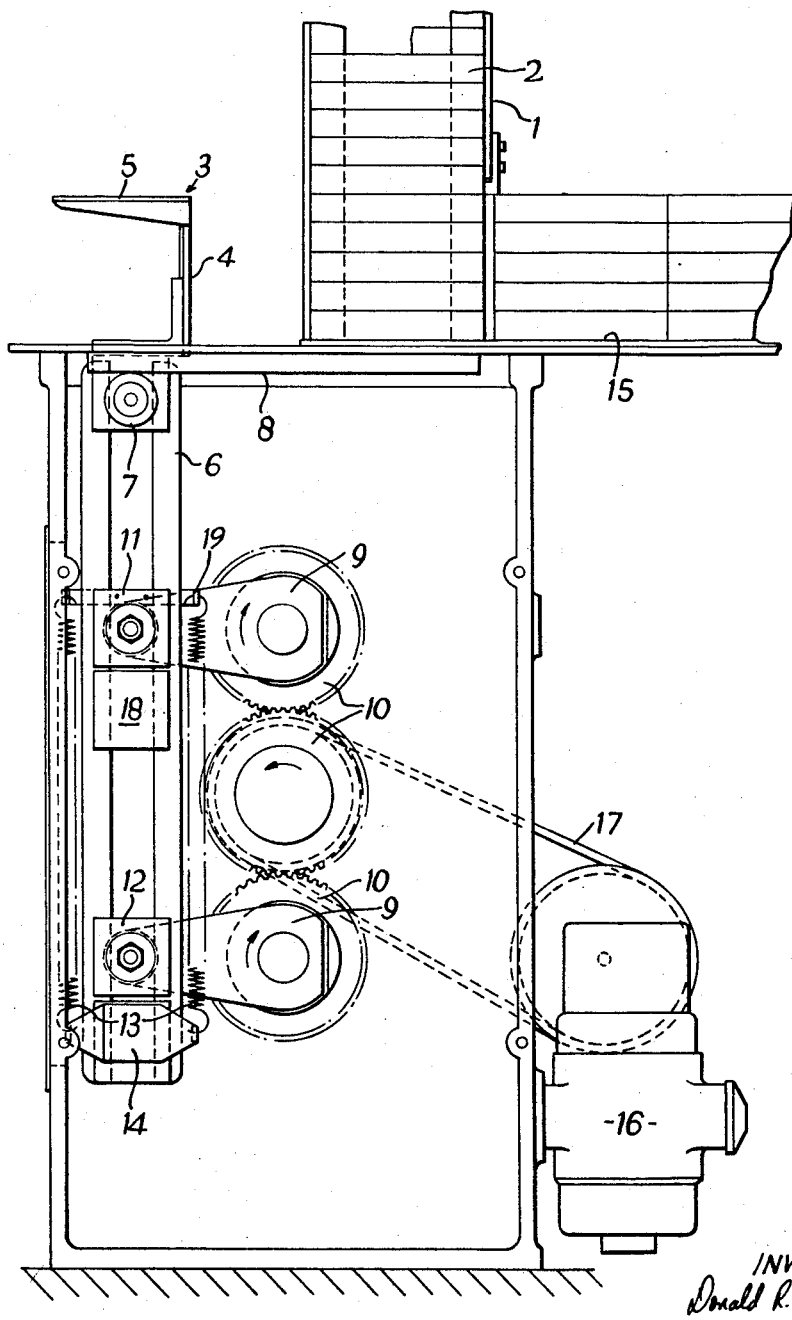
INVENTOR
Donald R. P. Jackson
BY
Watson, Cole, Grindle & Watson
ATTORNEYS

United States Patent Office 3,127,056
Patented Mar. 31, 1964

3,127,056
DEVICE FOR FEEDING ARTICLES FROM
THE BOTTOM OF A STACK
Donald Richard Patrick Jackson, Deptford, London, England, assignor to Molins Machine Company Limited, London, England, a British company
Filed June 28, 1961, Ser. No. 120,381
Claims priority, application Great Britain Aug. 5, 1960
2 Claims. (Cl. 221—262)

This invention concerns a device for feeding articles from the bottom of a stack.

In automatic machinery it is common to feed one or more articles from the base of a stack either by a reciprocating pusher or a conveyor provided with pushers, or some similar mechanism. If the articles are thin, one or more may be removed fairly easily from the bottom of the stack because after the pusher has passed out of the base of the magazine in which the articles are stacked the remainder of the stack can fall to the surface of a bed or other surface over which the articles are fed and on which the stack is supported. If however the articles are thick or are fragile it may be difficult to feed in this manner because the falling stack is liable to become misplaced in the magazine or, in the case of fragile articles, these may be broken. Further, with some articles because of their shape, or their nature, it is difficult, if they are allowed to fall freely, to arrange for them to fall nicely as a stack without upsetting the stacked condition.

An object of the invention is to provide a device for feeding articles from the base of a stack which is capable of feeding either a large number of articles at one stroke, or an article of considerable thickness, and lowering the remainder in the stack in an undisturbed manner. This object is achieved by arranging that the pusher which removes the articles from the base of a stack supports the articles during their downward movement to the bed or like surface after a batch has been removed.

According to the invention there is provided a device for feeding articles from the base of a stack arranged in a magazine, comprising a reciprocating pusher having an operative or pushing face and a support face at right-angles to the said pushing face, and adapted to support the articles remaining in the stack while those beneath said remainder are removed from the stack by the pushing face, and driving means for said pusher to cause it to move through the stack and remove articles therefrom and thereafter to move downward toward the bed or like surface while supporting the remaining articles of the stack by its support face and bringing the base of the stack down once more to the feeding position.

The pusher may be supported on a vertical support, for example a bar, and the driving means for the pusher may comprise a pair of cranks geared together for rotary movement and having slides at their free ends arranged to slide on the bar, a spring being provided for connecting the upper slide to the lower part of the bar, and a guide face being provided arranged to restrict the upward movement of the bar whereby during the crank motion the slides slide up the bar against the tension of the spring as the bar engages said guide face whereby the pusher is constrained to move in a horizontal direction on the pushing stroke while on the return motion of the cranks the pusher is pulled down, so that its support face moves downward with the stack as the latter moves down the magazine after the pusher moves backward out of the magazine.

The vertical support may be a slotted bar or similar frame with the slides formed as blocks and arranged to slide in the slot and two springs may be provided connected at their upper ends to the upper slide and to a position near the base of the frame at their lower end. An abutment may be fixed to the frame beneath the upper slide so that the latter may engage it on the return motion of the cranks, whereby the pusher is drawn downward. A roller may be provided at the top of the bar to engage the said guide face to avoid friction.

A construction according to the invention will now be described with reference to the accompanying drawing.

In the drawing, 1 is a magazine consisting of a suitable framework of such shape as to hold articles 2 in the form of a vertical stack and permit them to move freely down the magazine; 3 is a reciprocating pusher having an operative or pushing face 4 and a stack-supporting face 5 which are at right-angles to one another and this pusher is adjustably fixed to a support frame consisting of a slotted bar or the like 6 provided with a roller 7 near its top, which roller can run on a guide surface 8 and restrict upward movement of the support frame. This roller may be covered with rubber to avoid shock and noise when it first comes into contact with the guide surface, as will be clear later. A pair of cranks 9 are provided which are geared together by gearing 10 as shown, and the free ends of the cranks are attached to slide blocks 11 and 12 which are slidable in the slot of the support frame 6. Springs 13 are attached to a piece 14 fixed to the base of the support frame 6 and the upper ends of the springs are attached to a bar 19 fixed to the upper slide block 11.

In operation the cranks revolve in the direction of the arrows and the slide blocks move up and down in the slot of support frame 6 and cause the support frame and the attached pusher to be translated horizontally from the position shown so that the pusher moves through the base of the magazine and ejects a number of articles. In the drawing the articles are intended to be cigarette packets and five are ejected at a stroke. After the cranks have moved 180° from the position shown, the pusher is at its maximum forward position and then starts to move backward to the left but at the same time the slide blocks start moving down the slot in the support frame 6 and therefore the frame moves downward as the slide block 11 engages an abutment 18 fixed to the support frame 6 so as to bring the support face 5 of pusher lower than the level of the surface 15 over which the articles are fed and which provides a support for the articles in the stack. The lower face of the block 11 or the top face of the abutment 18 may have a rubber buffer or the like attached to it to avoid noise and shock when the parts meet. The downward movement of the frame withdraws the roller 7 from its guide 8 and later it rises into contact again as the next horizontal pusher stroke starts. The springs 13 serve, during this backward movement, to support the frame 6 and prevent it from falling by its weight.

The support face 5 will be below the level of the surface 15 when the crank arms 9 are at the bottom dead center and on their return to the position shown the pusher face 4 and face 5 will rise again to pushing level, for as the slide 11 starts to move up the slot, the springs 13 attached to the slide 11 and to the frame 6 at 14 will pull the frame 6 upward. It will be seen from the description that the pusher 3 passes through a D shaped movement with the stem of the D uppermost and horizontal.

The device is driven from a motor 16 by means of a belt 17 which drives the middle gear of the gearing 10.

What I claim as my invention and desire to secure by Letters Patent is:

1. A device for feeding articles from the base of a stack arranged in a magazine, comprising a reciprocating pusher having an operative or pushing face and a support face at right angles to the said pushing face, and adapted to support the articles remaining in the stack while those beneath said remaining articles are removed from the stack by the pushing face, a vertical support for the pusher, and driving means for the pusher including a pair of cranks geared together for rotary movement, and having slides at their free ends arranged to slide on the support, a spring connecting the upper slide to the lower part of the support, and a guide face positioned to restrict the upward movement of the support whereby during the crank motion the slides slide up the support against the tension of the spring as the support engages said guide face and the pusher is constrained to move in a horizontal direction on the pushing stroke and an abutment on the vertical support positioned to be engaged by one of said slides on the return motion of the cranks so that the pusher is pulled down and its support face moves downward with the stack as the latter moves down the magazine while the pusher moves backward out of the mazagine.

2. A device as claimed in claim 1 wherein the vertical support consists of a slotted frame and the slides are slidable in the slot and wherein two springs are provided connected at their upper ends to the upper slide and at their lower ends to a position near the base of the frame.

References Cited in the file of this patent
UNITED STATES PATENTS

| | | |
|---|---|---|
| 937,820 | Ladue | Oct. 26, 1909 |
| 1,676,293 | Simmons | July 10, 1928 |
| 1,769,650 | Rose | July 1, 1930 |
| 1,908,087 | Walter | May 9, 1933 |
| 2,614,252 | Stilwell | Oct. 21, 1952 |
| 2,639,737 | Forsberg | May 26, 1953 |